(12) United States Patent
Capoldi et al.

(10) Patent No.: US 10,493,712 B2
(45) Date of Patent: Dec. 3, 2019

(54) METHOD FOR MANUFACTURING A PULLEY DEVICE, A PULLEY DEVICE ACCORDING TO SUCH A MANUFACTURING METHOD AND AN ENGINE FITTED WITH SUCH A PULLEY

(71) Applicant: Aktiebolaget SKF, Gothenburg (SE)

(72) Inventors: Daniel Capoldi, Saint Cyr-sur-Loire (FR); Frederic Bordier, NeuilléPont Pierre (FR); Laurent Cherioux, Tours (FR); Thierry Prouteau, Tours (FR); Philippe Weber, Fondettes (FR)

(73) Assignee: AKTIEBOLAGET SKF, Gothenburg (SE)

( * ) Notice: Subject to any disclaimer, the term of this patent is extended or adjusted under 35 U.S.C. 154(b) by 172 days.

(21) Appl. No.: 15/230,897

(22) Filed: Aug. 8, 2016

(65) Prior Publication Data

US 2017/0036409 A1 Feb. 9, 2017

(30) Foreign Application Priority Data

Aug. 6, 2015 (FR) ..................... 15 57575

(51) Int. Cl.
| | |
|---|---|
| *B29D 99/00* | (2010.01) |
| *F16C 35/06* | (2006.01) |
| *F16C 35/067* | (2006.01) |
| *F16C 35/073* | (2006.01) |
| *F16C 13/00* | (2006.01) |
| *F16C 19/54* | (2006.01) |

(Continued)

(52) U.S. Cl.
CPC .... *B29D 99/0032* (2013.01); *B29C 45/14336* (2013.01); *F16C 13/006* (2013.01); *F16C 19/54* (2013.01); *F16C 35/061* (2013.01); *F16C 35/067* (2013.01); *F16C 35/073* (2013.01); *F16H 55/48* (2013.01); *B29L 2031/322* (2013.01); *F16C 2220/04* (2013.01); *F16C 2226/30* (2013.01); *F16C 2361/63* (2013.01)

(58) Field of Classification Search
CPC .......... B29D 99/0032; B29C 45/14336; B29C 45/00; F16C 13/006; F16C 35/061; F16H 55/36; F16H 55/54; F16H 55/56; B66D 3/04; B66D 2700/026
USPC ........................................ 254/404, 412, 416
See application file for complete search history.

(56) References Cited

U.S. PATENT DOCUMENTS

| 3,746,413 A | 7/1973 | Nishikawa |
| 2011/0111900 A1* | 5/2011 | Wilson .................. F16C 13/006 |
| | | 474/166 |

FOREIGN PATENT DOCUMENTS

| DE | 4420669 A1 | 1/1995 |
| DE | 29711143 U1 | 10/1998 |

(Continued)

OTHER PUBLICATIONS

Machine Translation for Watanabe, JP 2009-041584 A.*
Machine Translation for Kratz, DE 10035488 A1.*

*Primary Examiner* — Christopher J Besler
*Assistant Examiner* — Christine Pellazar Bersabal
(74) *Attorney, Agent, or Firm* — Garcia-Zamor Intellectual Property Law, LLC; Ruy Garcia-Zamor; Bryan Peckjian

(57) ABSTRACT

The invention relates to a method for manufacturing a pulley device for a tension roller or a roller of a transmission element providing a pulley, at least two rolling-element bearings and a sleeve, the rolling-element bearings being assembled adjacently on the sleeve before the pulley is (Continued)

formed by injecting material onto the rolling-element bearings.

8 Claims, 1 Drawing Sheet

(51) Int. Cl.
*F16H 55/48* (2006.01)
*B29C 45/14* (2006.01)
*B29L 31/32* (2006.01)

(56) References Cited

FOREIGN PATENT DOCUMENTS

| | | | | |
|---|---|---|---|---|
| DE | 10035488 A1 | * | 1/2002 | ............ F16C 13/006 |
| DE | 10333673 A1 | | 2/2005 | |
| DE | 102007015332 A1 | | 10/2008 | |
| FR | 2923281 A1 | | 5/2009 | |
| JP | 2002181167 A | | 6/2002 | |
| JP | 2006161950 A | | 6/2006 | |
| JP | 2009041584 A | * | 2/2009 | ............ F16H 55/48 |
| WO | 0133108 A1 | | 5/2001 | |

* cited by examiner

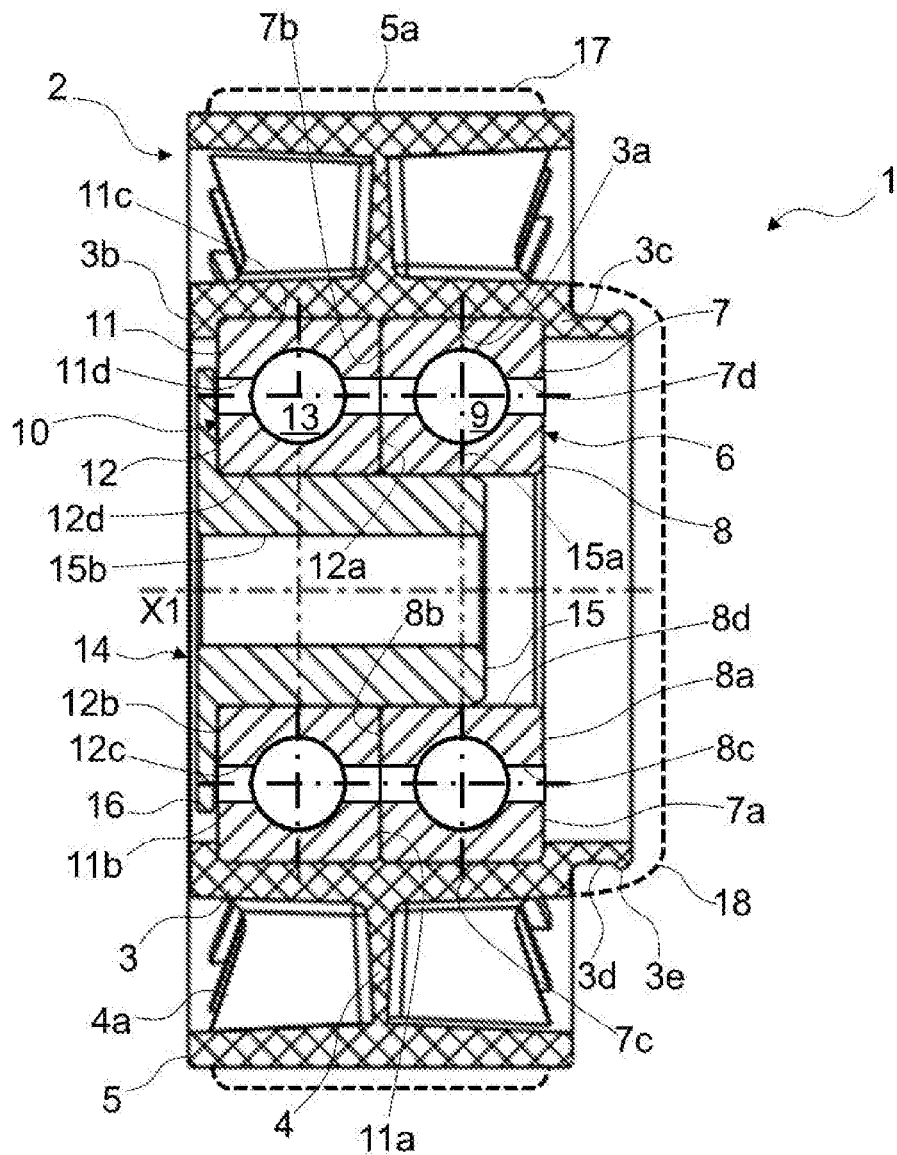

METHOD FOR MANUFACTURING A PULLEY DEVICE, A PULLEY DEVICE ACCORDING TO SUCH A MANUFACTURING METHOD AND AN ENGINE FITTED WITH SUCH A PULLEY

CROSS REFERENCE TO RELATED APPLICATIONS

This application claims priority to French patent application no. 1557575 filed on Aug. 6, 2015, the contents of which are fully incorporated herein by reference.

FIELD OF THE INVENTION

The present invention relates to a method for manufacturing a pulley device for a tension roller or roller designed to cooperate with a transmission element, for example a cam belt or chain of an internal-combustion engine of a motor vehicle. The invention also relates to an engine fitted with such a pulley device.

BACKGROUND OF THE INVENTION

Such a roller is usually used to permanently keep the tension of a transmission element, such as a belt or chain, within a given range, or to locally modify the path of the belt or chain. These are referred to respectively as tension rollers or rollers.

BRIEF SUMMARY OF THE INVENTION

In a roller, a pulley is mounted in rotation on a screw or a shaft by means of a bearing, the roller then being attached directly or indirectly to an engine block or to an element of a tension roller device, for example an articulated arm or a crank.

The bearing is a mechanical device designed to provide a pivot link between the pulley and the screw or the shaft. For this purpose, the bearing may be a rolling-element bearing.

It is known to provide a roller with a rolling-element bearing fitted with an inner ring, an outer ring surmounted by the pulley and a row of rolling elements, such as balls, seated radially between the races formed on each of the rings.

To bear greater loads, the rolling-element bearing may be fitted with at least two rows of rolling elements. According to an alternative, the roller may be fitted with at least two rolling-element bearings in a single row of rolling elements.

However, the use of a plurality of axially adjacent rolling-element bearings requires the use of a pulley mounted by interference on the outer rings of the rolling-element bearings, as described for example in WO 01/033108 A1. Indeed, manufacturing defects and tolerances inherent in the elements of each rolling-element bearing mean that there are axial and radial alignment faults even between two rolling-element bearings deemed to be identical. A pulley press fitted onto the outer rings of axially adjacent rolling-element bearings helps to eliminate alignment faults between the outer rings.

A rigid plastic or metal pulley can then be used for this purpose, the inner rings of the rolling-element bearings being mounted in an inner cylindrical surface of a central bore of the pulley.

However, such a constraint makes it impossible to manufacture a pulley by injecting material onto the outer rings of the rolling-element bearings. Indeed, in this case, the alignment faults cannot be eliminated by the pulley since the material forming the pulley is merely deposited and fits the rings. A pulley made of material that is less rigid, less solid and less expensive cannot be used. The process of over-moulding, which is known to the person skilled in the art and cheap, is also not appropriate.

The purpose of the present invention is to propose a new method for manufacturing a pulley device that is particularly simple and cheap to implement.

For this purpose, the invention relates to a method for manufacturing a pulley device for a tension roller or roller of a transmission element.

According to the invention, the device provides a pulley, at least two rolling-element bearings and a sleeve, and the method provides the following successive steps:

(a) At least two rolling-element bearings each having a single row of rolling elements are assembled in advance, the rolling-element bearings each comprising an inner ring having a bore, an outer ring having an outer cylindrical surface, and a single row of rolling elements seated radially between the inner rings and the outer rings, in which the rings may be in relative rotation about a central axis, (b) A sleeve is positioned coaxially with the rolling-element bearings, (c) The at least two rolling-element bearings, each having a single row of rolling elements, are assembled successively on an outer cylindrical surface of the sleeve, the inner rings of the rolling-element bearings bearing axially and successively against one another, the sleeve being common to all of the inner rings of the rolling-element bearings, and such that the outer cylindrical surface of the sleeve interferes with the bores of the inner rings of the axially adjacent rolling-element bearings; and (d) A plastic pulley is formed by injecting material onto the outer cylindrical surfaces of the outer rings of the rolling-element bearings.

According to the invention, the inner rings of the adjacent rolling-element bearings are all positioned and adjusted in relation to the outer cylindrical surface of the sleeve. The relative axial and radial alignment faults between the rings are compensated by the cylindricity of the outer surface of the sleeve. Such cylindricity is relatively easy to manufacture for the person skilled in the art.

Subsequently, a pulley is formed by injecting material onto the outer rings of the adjacent rolling-element bearings that have all been adjusted in relation to one another in the previous step. The injection process deposits material that fits the outer surfaces and any interstices between the outer rings of the rolling-element bearings, the interstices having been limited during the preceding positioning and adjustment step.

Consequently, the invention enables a plurality of single-row rolling-element bearings to be used in place of a multiple-row rolling-element bearing while retaining the technical advantages for the equivalent number of rows of rolling elements. Furthermore, a multiple-row rolling-element bearing is more expensive and requires greater precision to manufacture than several single-row rolling-element bearings, for the equivalent number of rows of rolling elements.

The invention also relates to a pulley device for a tension roller or roller obtained using such a manufacturing method.

According to advantageous but optional aspects of the invention, a pulley device obtained using such a manufacturing method may include one or more of the following features in any technically admissible combination:

The rolling elements of the rolling-element bearing are balls.

The rolling elements of the rolling-element bearing are held substantially regularly spaced out around the circumference by a cage.

The pulley is made of a material that can be injected, cast or moulded, for example plastic.

The pulley is made of polyamide PA66 with 30% glass fibre.

The pulley includes an outer axial portion designed to cooperate with a transmission element, an inner axial portion surmounting the outer rings of the rolling-element bearings, and a radial annular intermediate portion linking the axial portions.

The pulley has stiffening ribs arranged between the inner and outer axial portions and connected to the intermediate portion.

The inner axial portion of the pulley has two shoulders oriented radially towards the inside of the pulley device, the shoulders being positioned axially on either side of the assembly formed by the rolling-element bearings of the pulley device such that the adjacent outer rings of the rolling-element bearings are held axially by the shoulders.

The inner axial portion of the pulley is extended at one axial extremity by attachment means designed to cooperate with a cover.

The attachment means for a cover consist of an annular axial portion having a relief designed to be seated in a related cavity in the cover.

The relief is annular.

The sleeve is made of steel.

The sleeve is made of D10 sintered steel with binder.

The sleeve has a tubular portion including the outer cylindrical surface on which the rolling-element bearings are assembled, the tubular portion being extended at one axial extremity by an annular radial flange of greater diameter.

The external diameter of the flange of the sleeve is no greater than 90% of the internal diameter of the pulley such as to leave a free radial space between the flange and the pulley to enable a mould to be closed over the outer rings of the rolling-element bearings during the overmoulding process of the pulley.

The sleeve has a bore designed to hold a screw or a shaft.

The sleeve is provided with attachment means designed to be rigidly connected to a supporting element.

The invention also relates to an internal-combustion engine including at least one roller or tension roller device for a torque transmission element according to one of the embodiments mentioned above.

BRIEF DESCRIPTION OF THE DRAWING

The invention and other advantages of the invention are explained in greater detail in the following description of a single embodiment of a pulley device according to the principle of same, provided purely by way of example and with reference to the attached drawings representing an axial half section of such a pulley device.

FIG. 1 is a cross-sectional view of a pulley device for a tension roller or roller of a transmission element according to an exemplary embodiment of the invention.

DETAILED DESCRIPTION OF THE INVENTION

A pulley device for a tension roller or roller of a transmission element, indicated as a whole using reference sign 1, includes a pulley 2, two rolling-element bearings 6 and 10, and a sleeve 14.

The pulley 2 includes an inner axial portion 3, an outer axial portion 5 and a radial annular intermediate portion 4 linking the inner and outer portions 3, 5. The pulley 2 as a whole, and specifically the portions 3, 4, 5 forming the pulley, are annular about a central axis X1. Stiffening ribs 4a are provided between the inner and outer axial portions 3, 5 and are connected to the intermediate portion 4.

The outer axial portion 5 of the pulley 2 provides an outer cylindrical surface 5a designed to cooperate with a transmission element 17 shown using a dotted line, for example a belt or a chain.

The inner axial portion 3 of the pulley 2 has an axial extremity 3d extended axially by attachment means 3e designed to cooperate with a cover 18, shown using a dotted line. The axial extremity is annular and the attachment means provide an annular relief 3e designed to be seated in a related groove in a cover. Alternatively, the attachment means may involve gluing, or any other appropriate means.

The inner axial portion 3 of the pulley 2 has a bore 3a in which the two rolling-element bearings 6, 10 are seated.

The rolling-element bearing 6 includes an outer ring 7 having two radial front edges 7a, 7b, an outer cylindrical surface 7c and a bore 7d, and an inner ring 8 having two radial front edges 8a, 8b, an outer cylindrical surface 8c and a bore 8d.

The rolling-element bearing 6 has a single row of rolling elements 9, in this case balls, arranged between the toroidal races formed in the bore 7d of the outer ring 7 and in the outer cylindrical surface 8c of the inner ring 8.

The rings 7, 8 of the rolling-element bearing 6 may be in relative rotation about the central axis X1.

Similarly, the rolling-element bearing 10 includes an outer ring 11 having two radial front edges 11a, 11b, an outer cylindrical surface 11c and a bore 11d, and an inner ring 12 having two radial front edges 12a, 12b, an outer cylindrical surface 12c and a bore 12d.

The rolling-element bearing 10 has a single row of rolling elements 13, in this case balls, arranged between the toroidal races formed in the bore 11d of the outer ring 11 and in the outer cylindrical surface 12c of the inner ring 12.

The rings 11, 12 of the rolling-element bearing 10 may be in relative rotation about the central axis X1.

In the example embodiment illustrated, the outer rings 7, 11 and inner rings 8, 12 are solid, i.e. the rings are shaped by machining tubes, bars, forged blanks and/or rolled blanks with stock removal (turning, grinding).

The rolling elements 9, 13 may be seated in a cage (not shown) that maintains the circumferential spacing of the rolling elements.

The rolling-element bearings 6, 10 may each have one or two annular sealing means (not shown) on each side of the single row of rolling elements.

According to the invention, the rolling-element bearings 6, 10 with a single row of rolling elements 9, 13 respectively are axially adjacent.

The outer rings 7, 11 and inner rings 8, 12 of the two rolling-element bearings 6, 10 are respectively axially adjacent, such that the radial front edges 7b, 11a of the outer rings 7, 11 and the radial front edges 8b, 12a of the inner rings 8, 12 abut axially. Both of the rolling-element bearings 6, 10 are seated radially inside the pulley 2.

More specifically, the outer cylindrical surfaces 7c, 11c of the outer rings 7, 11 of the rolling-element bearings 6, 10 respectively are in contact with the bore 3a of the inner axial portion 3 of the pulley 2.

The inner axial portion 3 of the pulley 2 has two shoulders 3b, 3c oriented radially towards the inside of the pulley device 1, the shoulders 3b, 3c being positioned axially on both sides of the assembly formed by the rolling-element bearings 6, 10 of the pulley device 1. The shoulder 3b bears axially against the radial front edge 11b of the outer ring 11 of the rolling-element bearing 10 and the shoulder 3c bears axially against the radial front edge 7a of the outer ring 7 of the rolling-element bearing 6. Consequently, the axially adjacent outer rings 7, 11 of the rolling-element bearings 6, 10 are held axially by the shoulders 3b, 3c of the pulley 2.

The axially adjacent inner rings 8, 12 of the rolling-element bearings 6, 10 have adjacent bores 8d, 12d in which a sleeve 14 is seated.

The sleeve 14, having the central axis X1, has a cylindrical axial portion 15 providing an outer cylindrical surface 15a onto which the bores 8d, 12d of the inner rings 8, 12 of the rolling-element bearings 6, 10 respectively are fitted.

The cylindrical axial portion 15 is extended at one of the axial extremities of same by a radial annular flange 16 of greater diameter. On one side, the flange covers the free radial space between the bore 11d of the outer ring 11 and the outer cylindrical surface 12c of the inner ring 12 to prevent the ingress of contaminants from outside the device 1.

The flange 16 also forms an axial stop surface against which the radial front edge 12b of the inner ring 12 of the rolling-element bearing 10 bears.

Since the inner ring 8 of the other rolling-element bearing 6 of the device 1 also bears against the inner ring 12 of the rolling-element bearing 10, the flange 16 can be used as a reference for adjusting the axial position of the abutting adjacent inner rings.

Furthermore, the flange 16 may bear axially against a supporting element (not shown) outside the pulley device 1 to enable the assembly and attachment of the device 1 on the supporting element. The supporting element may for example be an engine block, and articulated arm or a crank of the related automatic tension roller. For this purpose, the sleeve 14 as a whole is provided with a through hole 15b into which a screw intended to rigidly connect the pulley device 1 to the supporting element can be inserted.

According to the invention, the device 1 is assembled according to the following successive steps:

The two rolling-element bearings 6 and 10, each having a single row of rolling elements, are assembled in advance, the rolling-element bearings 6, 10 each comprising an inner ring 8, 12 having a bore 8d, 12d respectively, an outer ring 7, 11 having an outer cylindrical surface 7c, 11c respectively, and a single row of rolling elements 9, 13 seated radially between the inner rings 8, 12 and outer rings 7, 11 respectively, in which the rings 7, 8 and 11, 12 may be in relative rotation about a central axis X1.

The sleeve 14 is positioned coaxially with the rolling-element bearings 6, 10.

The two rolling-element bearings 6, 10, each having a single row of rolling elements, are assembled successively on the outer cylindrical surface 15a of the cylindrical axial portion 15 of the sleeve 14, the axial portion 15 being common to all of the inner rings 8, 12 of the rolling-element bearings 6, 10 respectively. The outer cylindrical surface 15a of the axial portion 15 interferes with the bores 8d, 12d of the inner rings 8, 12 of the axially adjacent rolling-element bearings 6, 10.

More specifically, the position of the inner rings 8, 12 is adjusted on the cylindrical portion 15 to abut axially. Furthermore, the inner ring 12 of the rolling-element bearing 10 also bears axially against the flange 16 extending radially from the axial portion 15 of the sleeve in order to form a positioning reference and a stop for the inner rings 8, 12. Consequently, the outer rings 7, 11 move closer to one another until same bear axially against one another.

The plastic pulley 2 is then overmoulded onto the assembly formed by the outer rings 7, 11 of the rolling-element bearings 6, 10.

The pulley may advantageously be made of plastic, for example polyamide PA66 reinforced with 30% glass fibre.

According to an alternative (not shown), the device 1 may include more than two axially adjacent rolling-element bearings.

Preferably, the external diameter of the flange 16 of the sleeve 14 is no greater than 90% of the internal diameter of the pulley 2, and specifically of the shoulder 3b, such as to leave a free radial space between the flange 16 and the pulley 2 to enable a mould to be closed over the outer rings 7, 11 of the rolling-element bearings 6, 10 during the overmoulding process of the pulley 2.

The invention described above uses ball bearings. Other rolling elements, such as rollers or needles, can also be used.

The technical features of the embodiments and variants provided for above may be combined.

The invention claimed is:

1. A method for manufacturing a pulley device for a tension roller or a roller of a transmission element providing a pulley, at least two rolling-element bearings and a sleeve, the method comprising:
   (a) preassembling at least two rolling-element bearings, each having a single row of rolling elements, the rolling-element bearings each including an inner ring having a bore, an outer ring having an outer cylindrical surface, and a single row of rolling elements seated radially between the inner rings and the outer rings, and each having first and second axial bearing sides, wherein the rings rotate relatively about a central axis (X1),
   (b) positioning a sleeve coaxially with the at least two rolling-element bearings,
   (c) assembling the at least two rolling-element bearings on an outer cylindrical surface of the sleeve such that the second axial bearing side of each of the at least two rolling-element bearings axially abut each other, the inner rings of the rolling-element bearings bearing axially and successively against one another, the sleeve being common to all of the inner rings of the rolling-element bearings, and such that the outer cylindrical surface of the sleeve interferes with the bores of the inner rings of the axially adjacent rolling-element bearings, a portion of the inner ring of one of the at least two rolling-element bearings which is located at the first axial bearing side thereof forms a free inner ring section, the free inner ring section includes a radial front edge and a section of the one of the at least two inner rings which defines the bore, the free inner ring section not contacting another component, and
   (d) forming a plastic pulley by injecting material onto the outer cylindrical surfaces of the outer rings of the rolling-element bearings, the plastic pulley comprising an inner axial portion radially abutting and overlying the outer cylindrical surfaces of the at least two rolling-element bearings and axially overlying a portion of the first axial bearing side of each of the at least two rolling-element bearings such that the plastic pulley only axially restrains the at least two rolling-element bearings via contact between the inner axial portion of the plastic pulley along the first axial bearing side.

2. The method according to claim 1, wherein the plastic pulley is provided during the step of forming with an inner axial portion having two shoulders oriented radially towards the inside of the pulley device, the shoulders being positioned axially on both sides of an assembly formed by the rolling-element bearings of the pulley device such that the adjacent outer rings of the rolling-element bearings are held axially by the shoulders.

3. The method according to claim 1, wherein the plastic pulley is provided during the step of forming with the inner axial portion extended at one axial extremity by attachment means designed to cooperate with a cover.

4. The method according to claim 1, wherein the sleeve is provided with a tubular portion including the outer cylindrical surface on which the rolling-element bearings are assembled, the tubular portion being extended at one axial extremity by an annular radial flange of greater diameter.

5. The method according to claim 4, wherein the external diameter of the flange of the sleeve is no greater than 90% of the internal diameter of the pulley to leave a free radial space between the flange and the pulley to enable a mould to be closed over the outer rings of the rolling-element bearings during an overmoulding process of the pulley.

6. The method according to claim 1, wherein the sleeve is provided with a bore designed to hold a screw or a shaft.

7. The method according to claim 1, wherein the step of positioning the sleeve further comprises the sleeve not extending completely axially over a length of the bore formed by the at least two rolling-element bearings.

8. The method according to claim 7, forming the plastic pulley further comprises forming a shoulder adjacent a radial inner end of the inner axial portion, the shoulder extending axially away from the at least two rolling-element bearings.

* * * * *